United States Patent
Obie et al.

(10) Patent No.: US 12,521,031 B2
(45) Date of Patent: Jan. 13, 2026

(54) RIGHT LEG DRIVE THROUGH CONDUCTIVE CHASSIS

(71) Applicant: META PLATFORMS TECHNOLOGIES, LLC, Menlo Park, CA (US)

(72) Inventors: Gene R Obie, Coupeville, WA (US); Filipp Demenschonok, Bothell, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 1245 days.

(21) Appl. No.: 17/131,263

(22) Filed: Dec. 22, 2020

(65) Prior Publication Data
US 2022/0015663 A1    Jan. 20, 2022

Related U.S. Application Data

(60) Provisional application No. 63/055,589, filed on Jul. 23, 2020, provisional application No. 63/051,570, filed on Jul. 14, 2020.

(51) Int. Cl.
*A61B 5/25* (2021.01)
*A61B 5/00* (2006.01)
(Continued)

(52) U.S. Cl.
CPC .......... *A61B 5/0531* (2013.01); *A61B 5/7203* (2013.01); *A61B 2503/12* (2013.01);
(Continued)

(58) Field of Classification Search
CPC ................ A61B 5/0531; A61B 5/7203; A61B 2503/12; A61B 2560/0468;
(Continued)

(56) References Cited

U.S. PATENT DOCUMENTS

| | | | |
|---|---|---|---|
| 2006/0025666 A1* | 2/2006 | Getsla | A61B 5/296 600/372 |
| 2013/0211204 A1* | 8/2013 | Caduff | A61B 5/14532 600/300 |

(Continued)

FOREIGN PATENT DOCUMENTS

| | | |
|---|---|---|
| CN | 109171702 A | 1/2019 |
| EP | 1277434 A1 | 1/2003 |

OTHER PUBLICATIONS

International Preliminary Report on Patentability for International Application No. PCT/US2021/039039, mailed Jan. 26, 2023, 7 pages.
International Search Report and Written Opinion for International Application No. PCT/US2021/039039, mailed Nov. 5, 2021, 8 Pages.

*Primary Examiner* — Adam Z Minchella
(74) *Attorney, Agent, or Firm* — McDermott Will & Schulte LLP

(57) ABSTRACT

The disclosed biopotential measurement device may include a biopotential measurement circuit and a right leg drive ("RLD") circuit coupled to the biopotential measurement circuit. The device may also include electrodes coupled to the biopotential measurement circuit and a chassis housing the biopotential measurement circuit and the RLD circuit. The chassis may include a conductive portion, coupled to the RLD circuit, that may serve as an RLD electrode for the RLD circuit. Various other methods, systems, and computer-readable media are also disclosed.

20 Claims, 9 Drawing Sheets

(51) Int. Cl.
*A61B 5/0531* (2021.01)
*H04B 13/00* (2006.01)

(52) U.S. Cl.
CPC .............. *A61B 2560/0468* (2013.01); *A61B 2562/0209* (2013.01); *A61B 2562/043* (2013.01); *A61B 2562/164* (2013.01); *A61B 2562/166* (2013.01); *A61B 2562/182* (2013.01); *H04B 13/005* (2013.01)

(58) Field of Classification Search
CPC ...... A61B 2562/0209; A61B 2562/043; A61B 2562/164; A61B 2562/166; A61B 2562/182; H04B 13/005
See application file for complete search history.

(56) References Cited

U.S. PATENT DOCUMENTS

| | | | | |
|---|---|---|---|---|
| 2013/0261423 | A1* | 10/2013 | Herrala | A61B 5/397 600/546 |
| 2014/0012143 | A1* | 1/2014 | Gilbert | A61B 5/0245 600/483 |
| 2014/0051956 | A1* | 2/2014 | Dalene | A61B 5/14552 600/323 |
| 2016/0235323 | A1* | 8/2016 | Tadi | A61B 5/0006 |
| 2017/0188918 | A1* | 7/2017 | Banet | A61B 5/6825 |
| 2017/0202464 | A1* | 7/2017 | Tsao | A61B 5/332 |
| 2018/0020977 | A1 | 1/2018 | Li et al. | |
| 2020/0229761 | A1* | 7/2020 | Pandya | G04G 9/0005 |
| 2023/0225623 | A1* | 7/2023 | Carek | A61B 5/02125 600/300 |

* cited by examiner

RIGHT LEG DRIVE THROUGH CONDUCTIVE CHASSIS

CROSS REFERENCE TO RELATED APPLICATION

This application claims the benefit of U.S. Provisional Application No. 63/051,570, filed 14 Jul. 2020 and U.S. Provisional Application No. 63/055,589, filed 23 Jul. 2020, the disclosures of which are incorporated, in their entirety, by this reference.

BRIEF DESCRIPTION OF DRAWINGS

The accompanying drawings illustrate a number of exemplary embodiments and are a part of the specification. Together with the following description, these drawings demonstrate and explain various principles of the present disclosure.

Figure 1A:
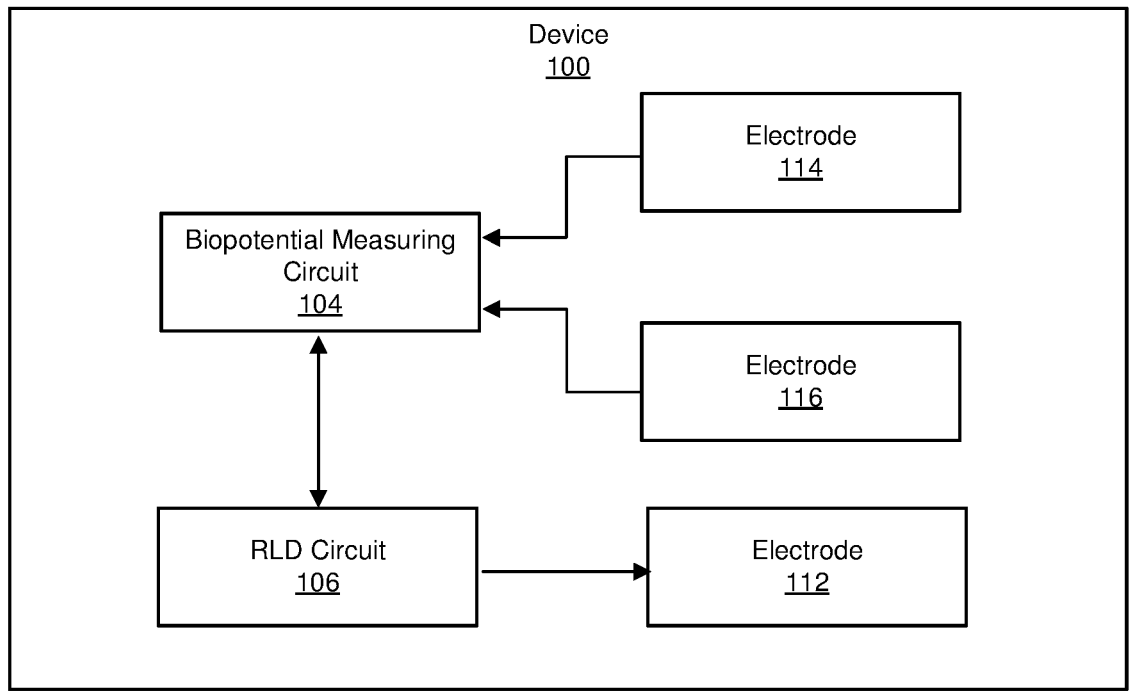
FIGS. 1A-B are diagrams of a biopotential measuring device according to embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Biopotential measurements involve measuring electrical signals from the human body. The human body itself may act as a conductor capable of receiving electromagnetic interference from nearby electrical signals, akin to an antenna. One such signal may include a common-mode signal. A common-mode signal may be a component of an analog signal having the same or common sign (e.g., + or −) that may be present on all conductors of a circuit. The common-mode signal may be induced by electromagnetic fields, which may be generated from oscillating voltages (e.g., changes in current), from nearby electrical sources. However, when measuring biopotential signals, the human body may exhibit an undesirable common-mode signal induced from nearby electronic devices, motors, electrical power lines, radio signals, etc. This common-mode signal present in the human body may act as interference, which may be known as common-mode interference, that may reduce the accuracy of the biopotential measurements.

Normally, the human body may be floating electrically, for instance because the human body may not normally be grounded to a particular voltage. As such, the human body may be susceptible to common-mode interference. An electrical circuit may be used to reduce or cancel this common-mode interference by actively driving an electrical signal—which may be a known voltage (e.g., a ground voltage)—into the body. Traditionally, the electrical circuit may drive the known voltage into the body part furthest from the heart (e.g., the right leg). Named for the right leg, right leg drive (RLD) circuits may reduce common-mode interference by applying an electrode to the right leg for driving the known voltage. Thus, biopotential measuring devices may include RLD circuits. However, conventional RLD circuits may present challenges in devices with small form factors. For example, a hand-held device may utilize an externally connected electrode that is sufficiently sized for driving an RLD signal.

The present disclosure is generally directed to a biopotential measurement device for measuring biopotential signals from a human body. The biopotential measurement device may include an RLD electrode for driving an RLD signal. As will be described further below, rather than connecting an external electrode, the RLD electrode may be implemented with the chassis of the biopotential measurement device. This distributed RLD design described herein may provide an RLD electrode of sufficient size without compromising a form factor of the device.

In addition, conventional biopotential measurement devices may use various ground layers to provide electrical shielding for internal circuits. The distributed RLD design described herein may provide electrical shielding without the need for additional ground layers as in conventional biopotential measurement devices.

FIG. 1A illustrates a device 100 that may include a biopotential measurement circuit 104, an electrode 114, an electrode 116, an RLD circuit 106, and an electrode 112. Biopotential measurement circuit 104 may be a circuit configured to measure biopotential signals via input from electrode 114 and electrode 116. Biopotential measurement circuit 104 may be implemented in any suitable manner. For example, biopotential measurement circuit 104 may correspond to an electrocardiogram (ECG), an electroencephalogram (EEG), an electromyograph (EMG), or combinations thereof. Electrode 114 and/or electrode 116 may be implemented in any suitable manner and may include conductive surfaces placed near or in contact with a person's skin for measuring the person's biopotential signals. For example, electrode 114 and/or electrode 116 may include metallic patches having adhesive gel for application to the person's skin.

As described above, an RLD circuit, such as RLD circuit 106, may be coupled to biopotential measurement circuit 104 to reduce common-mode interference exhibited by the person's body. RLD circuit 106 may be implemented in any suitable manner, such as a differential amplifier, an auxiliary amplifier, etc. RLD circuit 106 may drive an RLD signal to the person's body via electrode 112. The RLD signal may include a known voltage, such as a ground voltage for device 100 or other voltage that may not interfere with an operation of a human heart. Alternatively, the RLD signal may include an inverse noise signal that may cancel interference signals, such as 60 Hz noise from electrical power lines, radio frequency (RF) noise, etc. The inverse noise signal may be, for example, an out-of-phase signal corresponding to the common-mode interference detected on the person's body.

Figure 1B:
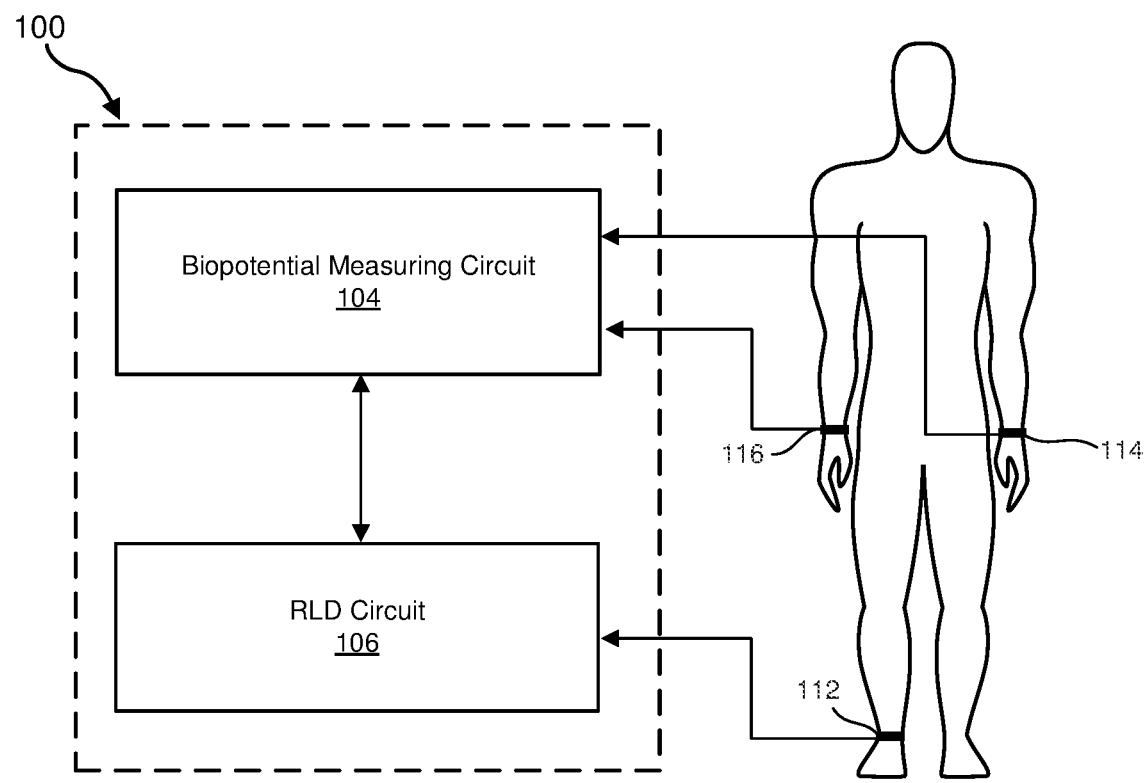

FIG. 1B illustrates a traditional example of how the electrodes of device 100 (e.g., electrodes 114, electrode 116, and electrode 112) may be applied to a person's body. As seen in FIG. 1B, electrode 114, which may correspond to a negative electrode, may be applied to one wrist (e.g., a left wrist) of the person. Electrode 116, which may correspond to a positive electrode, may be applied to the other wrist (e.g., a right wrist) of the person. Electrode 112, which may drive the RLD signal, may be applied to another limb (e.g., the right leg) of the person. However, to apply the electrodes as illustrated in FIG. 1B, device 100 may include long wires for electrode 112, electrode 114, and/or electrode 116, which may further introduce electrical interference and be prohibitive for use with small form factor devices.

Figure 2A:
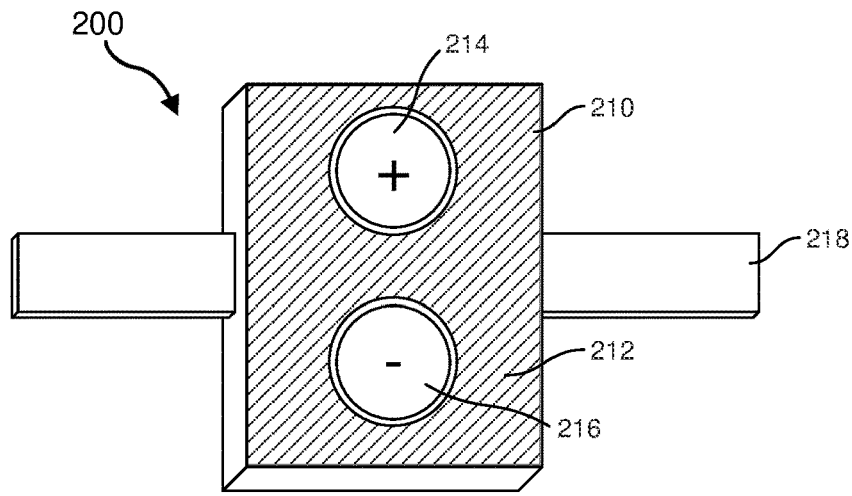
FIGS. 2A-C are diagrams of biopotential measuring devices according to embodiments of this disclosure.

FIG. 2A illustrates a device 200, which may correspond to an embodiment of device 100 having a small form factor, for measuring biopotential signals. Device 200 may include a chassis 210, a band 218, an electrode 214, an electrode 216, and an RLD electrode 212. Device 200 may correspond to, for example, a smart watch or other watch form factor, bracelet, ring, or other wearable device. Band 218 may be implemented in any suitable manner, such as a watchband, strap, etc. corresponding to a form factor of device 200.

Although not shown in FIG. 2A, chassis 210 may house a biopotential measurement circuit, such as biopotential measurement circuit 104, and an RLD circuit, such as RLD circuit 106. The biopotential measurement circuit may take measurements using electrode 214 and electrode 216. For instance, a person may attach device 200 to his or her wrist using band 218 (e.g., a wristband or watchband) such that electrode 214 and electrode 216 contacts the person's skin. Electrode 214 and electrode 216 may be implemented in any suitable manner, including exposed conductive surfaces on device 200.

To counter common-mode interference, the RLD circuit may drive an RLD signal via RLD electrode 212. As seen in FIG. 2A, RLD electrode 212 may be implemented with chassis 210. Chassis 210 may be implemented in any suitable manner. Chassis 210 may be conductive, for example being made of or including a metal or other conductive material, such as an impregnated plastic that may include a polymer having conductive fillers (e.g., aluminum, nickel, copper, silver, metallized glass, and other metallic fillers), an impregnated carbon, or a glass-fiber-resin mix. Alternatively, chassis 210 may have a conductive coating such as from vapor deposition, vacuum metallization, sputter coating, electron beam evaporation, etc. In some examples, chassis 210 may include combinations of conductive materials and coatings. In some examples, chassis 210 may include nonconductive portions, for instance to isolate electrode 214 and electrode 216 from RLD electrode 212. In some examples, portions of band 218 may be conductive such that RLD electrode 212 may include the conductive portions of band 218. For example, portions of chassis 210 may be incorporated into band 218.

By incorporating chassis 210 as RLD electrode 212, the RLD signal may be driven to the person's body using chassis 210. Chassis 210 may provide increased surface area and more consistent contact with human skin than conventional discrete electrodes without requiring fabrication of a unique electrode. On a wearable device or other small form factor device, an available surface area for electrodes may be limited. Therefore, chassis 210 may advantageously provide for RLD electrode 212 without requiring a larger form factor for the device 200. In addition, although the RLD signal may be traditionally driven to a person's right leg, embodiments of the present disclosure may instead drive the RLD signal to another part of the person's body (e.g., wrist). Moreover, chassis 210 may serve as an active shield to electrically shield the biopotential measurement circuit and the RLD circuit housed therein.

Figure 2B:
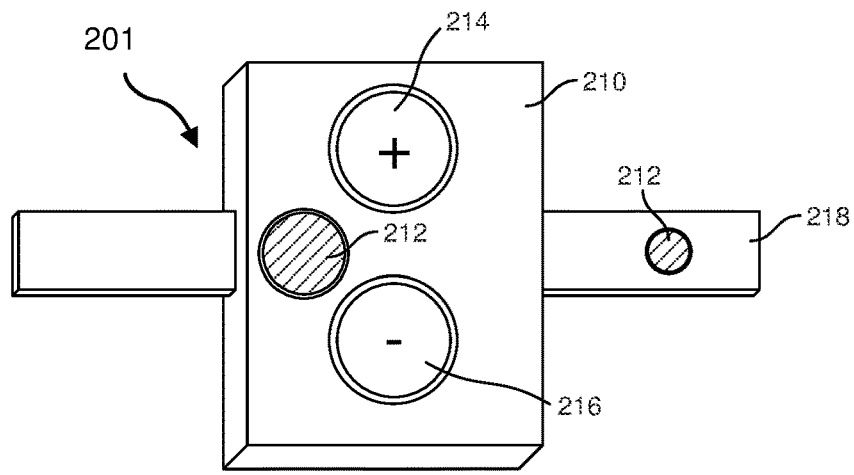
Figure 2C:
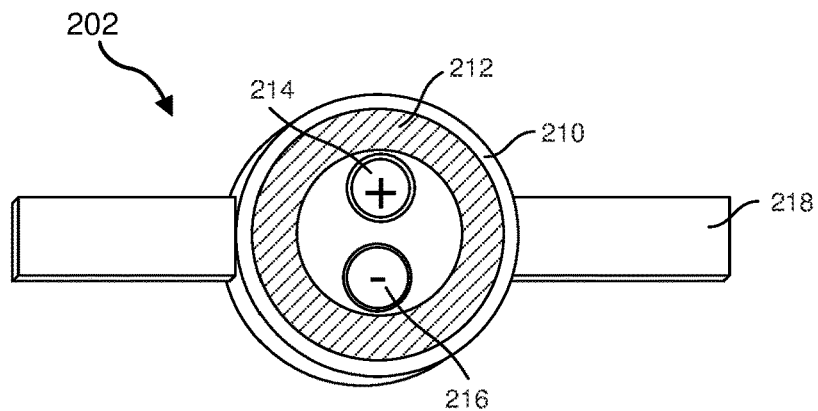

Chassis 210 and/or RLD electrode 212 may take on various shapes and/or forms, as illustrated in FIG. 2B and FIG. 2C. FIG. 2B illustrates a device 201 that may correspond to an alternative embodiment of device 200. Device 201 may include a chassis 210, a band 218, an electrode 214, an electrode 216, and an RLD electrode 212. RLD electrode 212 may include a conductive portion of chassis 210 and/or band 218 rather than a significant entirety of chassis 210 as in FIG. 2A. Although FIG. 2B illustrates RLD electrode 212 localized to a single portion of chassis 210 and a single portion of band 218, in other embodiments RLD electrode 212 may incorporate various shapes or patterns and may include other conductive portions of chassis 210 and/or band 218.

FIG. 2C illustrates a device 202 that may correspond to an alternative embodiment of device 200 and device 201. Device 202 may include a chassis 210, a band 218, an electrode 214, an electrode 216, and an RLD electrode 212. RLD electrode 212 may include a conductive portion of chassis 210 rather than a significant entirety of chassis 210 as in FIG. 2A. Although FIG. 2C illustrates RLD electrode 212 localized to a single portion of chassis 210, in other embodiments RLD electrode 212 may incorporate various shapes or patterns and may include other conductive portions of chassis 210 and/or band 218.

Devices 200, 201, and/or 202 may be communicatively connected to another device or system. For example, devices 200, 201, and/or 202 may serve as a biopotential input device for a computing system, such as an artificial reality system described below. In some examples, devices 200, 202, and/or 202 may be integrated with or work in conjunction with other input devices described herein.

Figure 3A:
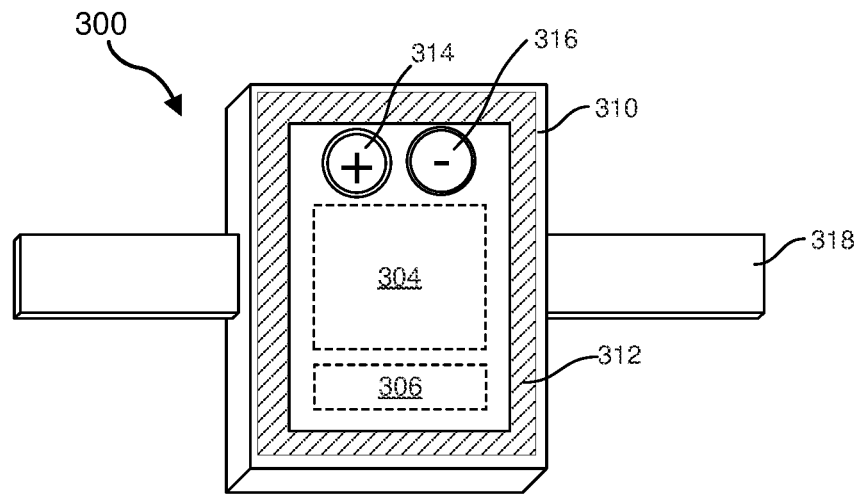
FIGS. 3A-B are diagrams of biopotential measuring devices including shielding according to embodiments of this disclosure.
Figure 3B:
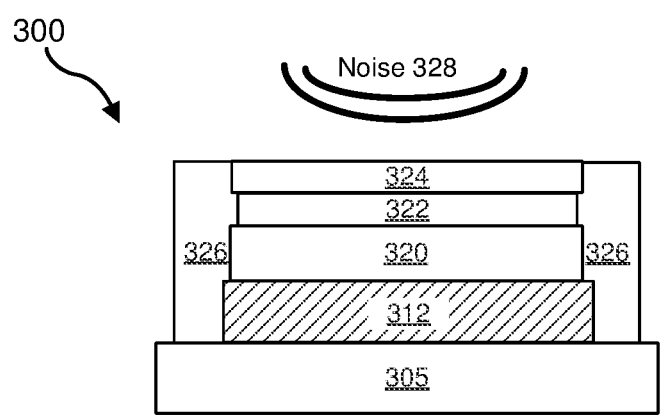

FIGS. 3A and 3B illustrate a device 300, which may correspond to an embodiment of device 100 having a small form factor, for measuring biopotential signals. Device 300 may include a chassis 310, a band 318, an electrode 314, an electrode 316, and an RLD electrode 312. Device 300 may correspond to, for example, a smart watch or other watch form factor, bracelet, ring, or other wearable device. Band 318 may be implemented in any suitable manner, such as a watchband, strap, etc. corresponding to a form factor of device 300.

As shown in FIG. 3A, chassis 310 may house a biopotential measurement circuit 304, which may correspond to biopotential measurement circuit 104, and an RLD circuit 306, which may correspond to RLD circuit 106. Biopotential measurement circuit 304 may take measurements using electrode 314 and electrode 316. For instance, a person may attach device 300 to his or her wrist using band 318 (e.g., a wristband or watchband) such that electrode 314 and electrode 316 contacts the person's skin. Electrode 314 and electrode 316 may be implemented in any suitable manner, including exposed conductive surfaces on device 300.

To counter common-mode interference, RLD circuit 306 may drive an RLD signal via RLD electrode 312. As seen in FIG. 3A, RLD electrode 312 may be implemented with chassis 310. Chassis 310 may be implemented in any suitable manner as described herein. Chassis 310 may be conductive, for example being made of or including a metal or other conductive material, such as an impregnated plastic that may include a polymer having conductive fillers (e.g., aluminum, nickel, copper, silver, metallized glass, and other metallic fillers), an impregnated carbon, or a glass-fiber-resin mix. Alternatively, chassis 310 may have a conductive coating such as from vapor deposition, vacuum metallization, sputter coating, electron beam evaporation, etc. In some examples, chassis 310 may include combinations of conductive materials and coatings. In some examples, chassis 310 may include nonconductive portions, for instance to isolate electrode 314 and electrode 316 from RLD electrode 312. In some examples, portions of band 318 may be conductive such that RLD electrode 312 may include the conductive portions of band 318. For example, portions of chassis 310 may be incorporated into band 318.

By incorporating chassis 310 as RLD electrode 312, the RLD signal may be driven to the person's body using chassis 310. Chassis 210 may provide increased surface area and more consistent contact with human skin than conventional discrete electrodes without requiring fabrication of a unique electrode. On a wearable device or other small form factor device, an available surface area for electrodes may be limited. Therefore, chassis 210 may advantageously provide for RLD electrode 212 without requiring a larger form factor for the device 200. In addition, although the RLD signal may be traditionally driven to a person's right leg, embodiments of the present disclosure may instead drive the RLD signal to another part of the person's body (e.g., wrist). Moreover, chassis 210 may serve as an active shield to electrically shield the biopotential measurement circuit and the RLD circuit housed therein, as will be described in further detail with respect to FIG. 3B.

FIG. 3B illustrates a simplified partial side view of device 300. As illustrated in FIG. 3B, device 300 may include RLD electrode 312, a circuit layer 320, a shield layer 322, a stiffener 324, and a skin interface 326. Device 300 may make contact against a person's wrist 305, although in other examples, device 300 may contact another body part such as the person's arm, leg, etc. As illustrated in FIG. 3B, RLD electrode 312 of chassis 310 may make direct contact to wrist 305.

Circuit layer 320 may include various circuits of device 300, such as biopotential measurement circuit 304 and in some examples, RLD circuit 306. Circuit layer 320 may include one or more of a printed circuit board and/or a flexible circuit. Shield layer 322 may be a top layer of circuit layer 320. Shield layer 322 may be made of a conductive material as described herein. In some examples, shield layer 322 may be a part of or may otherwise be integrated with another circuit, such as RLD circuit 306. Stiffener 324 may be made of a rigid material, such as polyimide, metal, or other stiff material, and may provide structural support, particularly in embodiments in which circuit layer 320 is a flexible circuit. Skin interface 326 may at least partially surround at least circuit layer 320 and may be made of a foam material, a rubber material, a plastic material, a hard electrode, and/or a pogo pin.

RLD electrode 312, shield layer 322, and skin interface 326 may form a Faraday cage around circuit layer 320 such that biopotential measurement circuit 304 and/or RLD circuit 306 may be electrically shielded from noise 328. Noise 328 may include electromagnetic interference such as 60 Hz noise or other interference signals as described herein. A Faraday cage may comprise a continuous conductive material or a mesh of conductive material. An external electromagnetic field may cause electrical charges within the Faraday cage's conductive material to distribute such that the external electromagnetic field's effects may be canceled in the Faraday cage's interior. Thus, the Faraday cage formed from the distributed RLD design (e.g., RLD electrode 312, shield layer 322, and skin interface 326) may cancel the effects of noise 328 on circuit layer 320 (e.g., biopotential measurement circuit 304).

Although FIG. 3A illustrates one electrode arrangement for a distributed RLD design, other examples may use other electrode arrangements and form factors, as seen in FIGS. 2A-C. In addition, device 300 may be communicatively connected to another device or system. For example, device 300 may serve as a biopotential input device for a computing system, such as an artificial reality system described below. In some examples, device 300 may be integrated with or work in conjunction with other input devices described herein.

Figure 4:
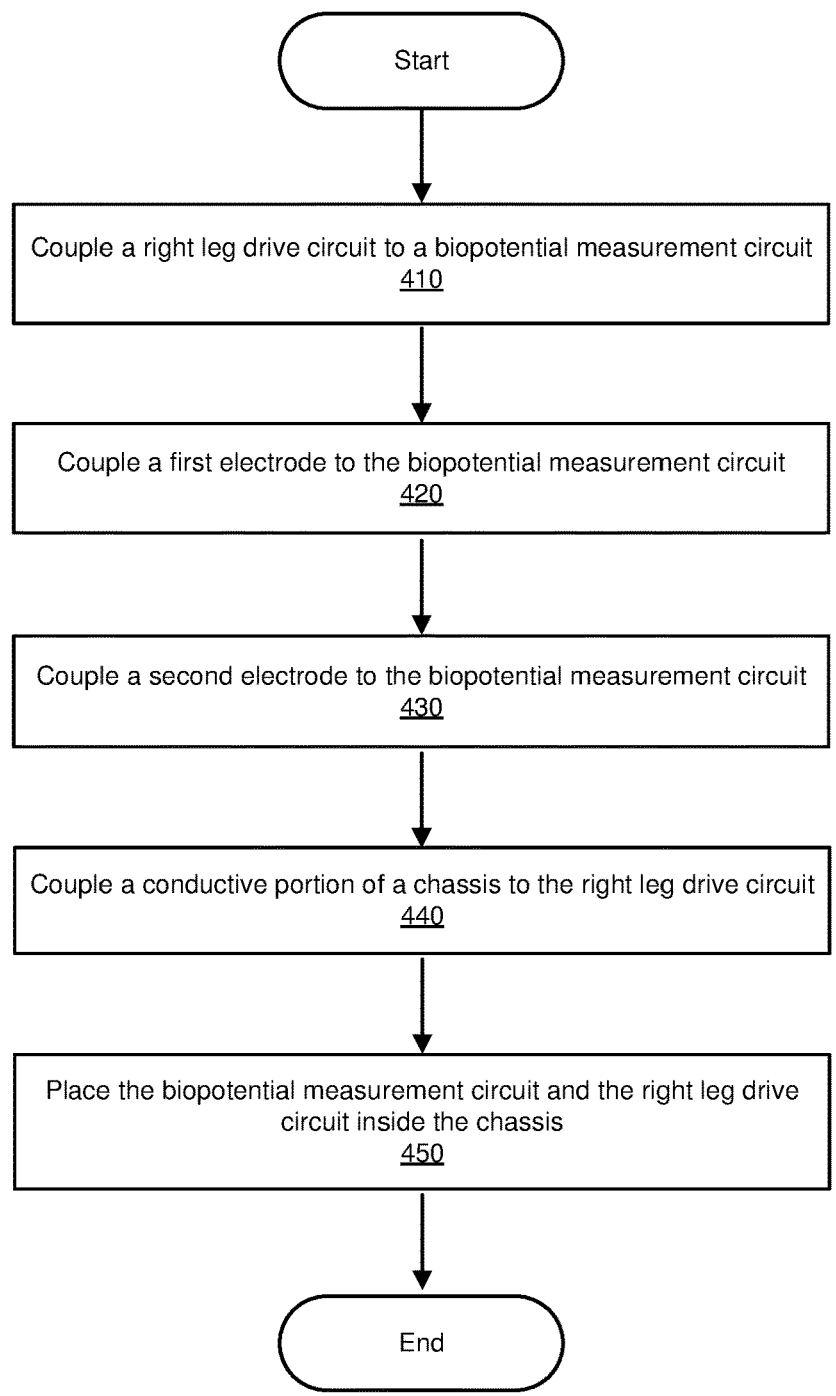
FIG. 4 is a flow diagram of an exemplary method for assembling a biopotential measurement device according to embodiments of this disclosure.

FIG. 4 is a flow diagram of an exemplary method 400 for assembling a biopotential measurement device with a distributed RLD design as described herein, such as the device(s) illustrated in FIGS. 2A-C and/or 3A-B.

As illustrated in FIG. 4, step 410 includes coupling a right leg drive circuit to a biopotential measurement circuit. For example, RLD circuit 306 may be coupled to biopotential measurement circuit 304.

Step 420 may involve coupling a first electrode to the biopotential measurement circuit. For example, electrode 314 may be coupled to biopotential measurement circuit 304.

Step 430 may involve coupling a second electrode to the biopotential measurement circuit. For example, electrode 316 may be coupled to biopotential measurement circuit 304.

Step 440 may involve coupling a conductive portion of a chassis to the right leg drive circuit. For example, RLD electrode 312 of chassis 310 may be coupled to RLD circuit 306.

Step 450 may involve placing the biopotential measurement circuit and the right leg drive circuit inside the chassis. For example, biopotential measurement circuit 304 and/or RLD circuit 306 may be placed in chassis 310.

Some examples may further involve placing a shield layer opposite the conductive portion and a skin interface portion at least partially around the biopotential measurement circuit to form a Faraday cage that electrically shields the biopotential measurement circuit. For example, shield layer 322 (which may be part of RLD circuit 306) may be placed opposite RLD electrode 312 such that circuit layer 320 (e.g., biopotential measurement circuit 304) is between shield layer 322 and RLD electrode 312. Skin interface 326 may be placed around circuit layer 320 to complete the Faraday cage.

The inventive concepts described herein may provide for a more effective RLD circuit by providing an RLD electrode that having consistent skin contact and increased surface area compared to conventional electrodes. In addition, by incorporating the RLD electrode into the device's chassis, the impact on industrial design of incorporating a separate RLD electrode may be reduced.

In addition, taking further advantage of the chassis' form factor, portions of chassis may be used to provide electrical shielding for the circuits therein. The chassis may form part of a Faraday cage around the electrodes and circuitry. The top of the Faraday cage may be formed from the top layers of the circuits and the sides of the Faraday cage may be made out of an interface to the skin.

In other examples, the distributed RLD circuit design described herein may form the Faraday cage for electrically shielding internal circuitry such as a biopotential measurement circuit. The RLD electrode, incorporated with the chassis, may form the bottom of the Faraday cage. The RLD circuit itself, or portions thereof, may for the top of the Faraday cage. Additional materials along the chassis' sidewalls may form the sides of the Faraday cage. Thus, the distributed RLD circuit described herein may serve two functions of driving a body to a known voltage potential, and providing shielding from external interference.

EXAMPLE EMBODIMENTS

Example 1. A biopotential measurement device comprising: a biopotential measurement circuit; a right leg drive circuit coupled to the biopotential measurement circuit; a first electrode coupled to the biopotential measurement circuit; a second electrode coupled to the biopotential measurement circuit; and a chassis housing the biopotential measurement circuit and the right leg drive circuit, wherein the chassis includes a conductive portion coupled to the right leg drive circuit.

Example 2. The biopotential measurement device of Example 1, further comprising: a shield layer opposite the conductive portion; and a skin interface portion; wherein the biopotential measurement circuit is between the shield layer and the conductive portion and the skin interface portion at least partially surrounds the biopotential measurement circuit such that the shield layer, skin interface portion, and the conductive portion forms a Faraday cage that electrically shields the biopotential measurement circuit.

Example 3. The biopotential measurement device of Example 2, wherein the shield layer comprises a top layer of the biopotential measurement circuit.

Example 4. The biopotential measurement device of Example 2 or 3, wherein the biopotential measurement circuit comprises at least one of a printed circuit board or a flexible circuit.

Example 5. The biopotential measurement device of any of Examples 2-4, wherein the skin interface portion comprises at least one of a foam material, a rubber material, a plastic material, a hard electrode, or a pogo pin.

Example 6. The biopotential measurement device of any of Examples 2-5, wherein the shield layer, skin interface portion, and the conductive portion forms a Faraday cage for electrically shielding the right leg drive circuit.

Example 7. The biopotential measurement device of any of Examples 1-6, wherein the conductive portion comprises at least one of a metal, an impregnated plastic, or a conductive coating.

Example 8. The biopotential measurement device of any of Examples 1-7, wherein the conductive portion drives a right leg drive signal from the right leg drive circuit to a body part touching the conductive portion.

Example 9. The biopotential measurement device of Example 8, wherein the right leg drive signal comprises a known voltage.

Example 10. The biopotential measurement device of Example 8 or 9, wherein the right leg drive signal comprises an inverse noise signal.

Example 11. The biopotential measurement device of any of Examples 1-10, wherein the biopotential measurement device comprises a watch form factor.

Example 12. The biopotential measurement device of Example 11, wherein a watchband of the biopotential measurement device includes the conductive portion.

Example 13. A system comprising: at least one physical processor; physical memory comprising computer-executable instructions; and a biopotential measurement device communicatively coupled to the at least one physical processor, comprising: a biopotential measurement circuit; a right leg drive circuit coupled to the biopotential measurement circuit; a first electrode coupled to the biopotential measurement circuit; a second electrode coupled to the biopotential measurement circuit; and a chassis housing the biopotential measurement circuit and the right leg drive circuit, wherein the chassis comprises a conductive portion coupled to the right leg drive circuit.

Example 14. The system of Example 13, wherein the biopotential measurement device further comprises: a shield layer opposite the conductive portion; and a skin interface portion; wherein the biopotential measurement circuit is between the shield layer and the conductive portion and the skin interface portion at least partially surrounds the biopotential measurement circuit such that the shield layer, skin interface portion, and the conductive portion forms a Faraday cage that electrically shields the biopotential measurement circuit.

Example 15. The system of Example 13 or 14, wherein: the shield layer comprises a top layer of the biopotential measurement circuit; the biopotential measurement circuit comprises at least one of a printed circuit board or a flexible circuit; and the skin interface portion comprises at least one of a foam material, a rubber material, a plastic material, a hard electrode, or a pogo pin.

Example 16. The system of any of Examples 13-15, wherein the conductive portion drives a right leg drive signal from the right leg drive circuit to a body part touching the conductive portion, wherein the right leg drive signal comprises at least one of a known voltage or an inverse noise signal.

Example 17. The system of any of Examples 13-16, wherein the at least one physical processor and the physical memory comprise an artificial reality system.

Example 18. The system of Example 17, wherein the biopotential measurement device sends data from the biopotential measurement circuit to the artificial reality system.

Example 19. A method comprising: coupling a right leg drive circuit to a biopotential measurement circuit; coupling a first electrode to the biopotential measurement circuit; coupling a second electrode to the biopotential measurement circuit; coupling a conductive portion of a chassis to the right leg drive circuit; and placing the biopotential measurement circuit and the right leg drive circuit inside the chassis.

Example 20. The method of Example 19, further comprising placing a shield layer opposite the conductive portion and a skin interface portion at least partially around the biopotential measurement circuit to form a Faraday cage that electrically shields the biopotential measurement circuit.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 500 in FIG. 5) or that visually immerses a user in an artificial reality (such as, e.g., virtual-reality system 600 in FIG. 6). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 5:
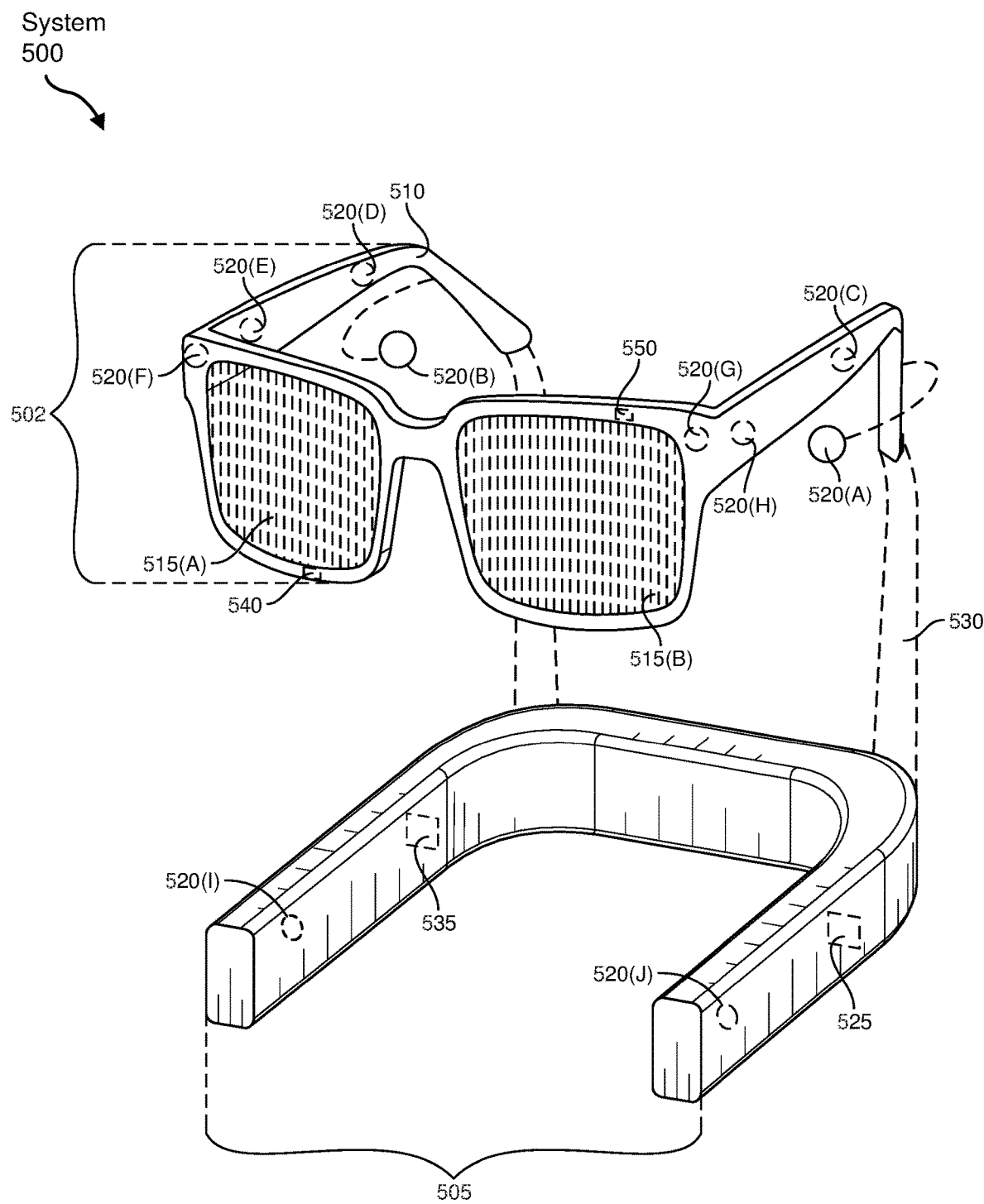
FIG. 5 is an illustration of exemplary augmented-reality glasses that may be used in connection with embodiments of this disclosure.

Turning to FIG. 5, augmented-reality system 500 may include an eyewear device 502 with a frame 510 configured to hold a left display device 515(A) and a right display device 515(B) in front of a user's eyes. Display devices 515(A) and 515(B) may act together or independently to present an image or series of images to a user. While augmented-reality system 500 includes two displays, embodiments of this disclosure may be implemented in augmented-reality systems with a single NED or more than two NEDs.

In some embodiments, augmented-reality system 500 may include one or more sensors, such as sensor 540. Sensor 540 may generate measurement signals in response to motion of augmented-reality system 500 and may be located on substantially any portion of frame 510. Sensor 540 may represent one or more of a variety of different sensing mechanisms, such as a position sensor, an inertial measurement unit (IMU), a depth camera assembly, a structured light emitter and/or detector, or any combination thereof. In some embodiments, augmented-reality system 500 may or may not include sensor 540 or may include more than one sensor. In embodiments in which sensor 540 includes an IMU, the IMU may generate calibration data based on measurement signals from sensor 540. Examples of sensor 540 may include, without limitation, accelerometers, gyroscopes, magnetometers, other suitable types of sensors that detect motion, sensors used for error correction of the IMU, or some combination thereof.

In some examples, augmented-reality system 500 may also include a microphone array with a plurality of acoustic transducers 520(A)-520(J), referred to collectively as acoustic transducers 520. Acoustic transducers 520 may represent transducers that detect air pressure variations induced by sound waves. Each acoustic transducer 520 may be configured to detect sound and convert the detected sound into an electronic format (e.g., an analog or digital format). The microphone array in FIG. 6 may include, for example, ten acoustic transducers: 520(A) and 520(B), which may be designed to be placed inside a corresponding ear of the user, acoustic transducers 520(C), 520(D), 520(E), 520(F), 520 (G), and 520(H), which may be positioned at various locations on frame 510, and/or acoustic transducers 520(I) and 520(J), which may be positioned on a corresponding neckband 505.

In some embodiments, one or more of acoustic transducers 520(A)-(F) may be used as output transducers (e.g., speakers). For example, acoustic transducers 520(A) and/or 520(B) may be earbuds or any other suitable type of headphone or speaker.

The configuration of acoustic transducers 520 of the microphone array may vary. While augmented-reality system 500 is shown in FIG. 5 as having ten acoustic transducers 520, the number of acoustic transducers 520 may be greater or less than ten. In some embodiments, using higher numbers of acoustic transducers 520 may increase the amount of audio information collected and/or the sensitivity and accuracy of the audio information. In contrast, using a lower number of acoustic transducers 520 may decrease the computing power required by an associated controller 550 to process the collected audio information. In addition, the position of each acoustic transducer 520 of the microphone array may vary. For example, the position of an acoustic transducer 520 may include a defined position on the user, a defined coordinate on frame 510, an orientation associated with each acoustic transducer 520, or some combination thereof.

Acoustic transducers 520(A) and 520(B) may be positioned on different parts of the user's ear, such as behind the pinna, behind the tragus, and/or within the auricle or fossa. Or, there may be additional acoustic transducers 520 on or surrounding the ear in addition to acoustic transducers 520 inside the ear canal. Having an acoustic transducer 520 positioned next to an ear canal of a user may enable the microphone array to collect information on how sounds arrive at the ear canal. By positioning at least two of acoustic transducers 520 on either side of a user's head (e.g., as binaural microphones), augmented-reality device 500 may simulate binaural hearing and capture a 3D stereo sound field around about a user's head. In some embodiments, acoustic transducers 520(A) and 520(B) may be connected to augmented-reality system 500 via a wired connection 530, and in other embodiments acoustic transducers 520(A) and 520(B) may be connected to augmented-reality system 500 via a wireless connection (e.g., a Bluetooth connection). In still other embodiments, acoustic transducers 520(A) and 520(B) may not be used at all in conjunction with augmented-reality system 500.

Acoustic transducers 520 on frame 510 may be positioned in a variety of different ways, including along the length of the temples, across the bridge, above or below display devices 515(A) and 515(B), or some combination thereof. Acoustic transducers 520 may also be oriented such that the microphone array is able to detect sounds in a wide range of directions surrounding the user wearing the augmented-reality system 500. In some embodiments, an optimization process may be performed during manufacturing of augmented-reality system 500 to determine relative positioning of each acoustic transducer 520 in the microphone array.

In some examples, augmented-reality system 500 may include or be connected to an external device (e.g., a paired device), such as neckband 505. Neckband 505 generally represents any type or form of paired device. Thus, the following discussion of neckband 505 may also apply to various other paired devices, such as charging cases, smart watches, smart phones, wrist bands, other wearable devices, hand-held controllers, tablet computers, laptop computers, other external compute devices, etc.

As shown, neckband 505 may be coupled to eyewear device 502 via one or more connectors. The connectors may be wired or wireless and may include electrical and/or non-electrical (e.g., structural) components. In some cases, eyewear device 502 and neckband 505 may operate independently without any wired or wireless connection between them. While FIG. 5 illustrates the components of eyewear device 502 and neckband 505 in example locations on eyewear device 502 and neckband 505, the components may be located elsewhere and/or distributed differently on eyewear device 502 and/or neckband 505. In some embodiments, the components of eyewear device 502 and neckband 505 may be located on one or more additional peripheral devices paired with eyewear device 502, neckband 505, or some combination thereof.

Pairing external devices, such as neckband 505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 500 may be provided by a paired device or shared between a paired device and an eyewear device, thus reducing the weight, heat profile, and form factor of the eyewear device overall while still retaining desired functionality. For example, neckband 505 may allow components that would otherwise be included on an eyewear device to be included in neckband 505 since users may tolerate a heavier weight load on their shoulders than they would tolerate on their heads. Neckband 505 may also have a larger surface area over which to diffuse and disperse heat to the ambient environment. Thus, neckband 505 may allow for greater battery and computation capacity than might otherwise have been possible on a stand-alone eyewear device. Since weight carried in neckband 505 may be less invasive to a user than weight carried in eyewear device 502, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 505 may be communicatively coupled with eyewear device 502 and/or to other devices. These other devices may provide certain functions (e.g., tracking, localizing, depth mapping, processing, storage, etc.) to augmented-reality system 500. In the embodiment of FIG. 5, neckband 505 may include two acoustic transducers (e.g., 520(I) and 520(J)) that are part of the microphone array (or potentially form their own microphone subarray). Neckband 505 may also include a controller 525 and a power source 535.

Acoustic transducers 520(I) and 520(J) of neckband 505 may be configured to detect sound and convert the detected sound into an electronic format (analog or digital). In the embodiment of FIG. 5, acoustic transducers 520(I) and 520(J) may be positioned on neckband 505, thereby increasing the distance between the neckband acoustic transducers 520(I) and 520(J) and other acoustic transducers 520 positioned on eyewear device 502. In some cases, increasing the distance between acoustic transducers 520 of the microphone array may improve the accuracy of beamforming performed via the microphone array. For example, if a sound is detected by acoustic transducers 520(C) and 520(D) and the distance between acoustic transducers 520(C) and 520(D) is greater than, e.g., the distance between acoustic transducers 520(D) and 520(E), the determined source location of the detected sound may be more accurate than if the sound had been detected by acoustic transducers 520(D) and 520(E).

Controller 525 of neckband 505 may process information generated by the sensors on neckband 505 and/or augmented-reality system 500. For example, controller 525 may process information from the microphone array that describes sounds detected by the microphone array. For each detected sound, controller 525 may perform a direction-of-arrival (DOA) estimation to estimate a direction from which the detected sound arrived at the microphone array. As the microphone array detects sounds, controller 525 may populate an audio data set with the information. In embodiments in which augmented-reality system 500 includes an inertial measurement unit, controller 525 may compute all inertial and spatial calculations from the IMU located on eyewear device 502. A connector may convey information between augmented-reality system 500 and neckband 505 and between augmented-reality system 500 and controller 525. The information may be in the form of optical data, electrical data, wireless data, or any other transmittable data form. Moving the processing of information generated by augmented-reality system 500 to neckband 505 may reduce weight and heat in eyewear device 502, making it more comfortable to the user.

Power source 535 in neckband 505 may provide power to eyewear device 502 and/or to neckband 505. Power source 535 may include, without limitation, lithium ion batteries, lithium-polymer batteries, primary lithium batteries, alkaline batteries, or any other form of power storage. In some cases, power source 535 may be a wired power source. Including power source 535 on neckband 505 instead of on eyewear device 502 may help better distribute the weight and heat generated by power source 535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 600 in FIG. 6, that mostly or completely covers a user's field of view. Virtual-reality system 600 may include a front rigid body 602 and a band 604 shaped to fit around a user's head. Virtual-reality system 600 may also include output audio transducers 606(A) and 606(B). Furthermore, while not shown in FIG. 6, front rigid body 602 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 500 and/or virtual-reality system 600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some the artificial-reality systems described herein may include one or more projection systems. For example, display devices in augmented-reality system 500 and/or virtual-reality system 600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 500 and/or virtual-reality system 600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 500 and 600 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 7:
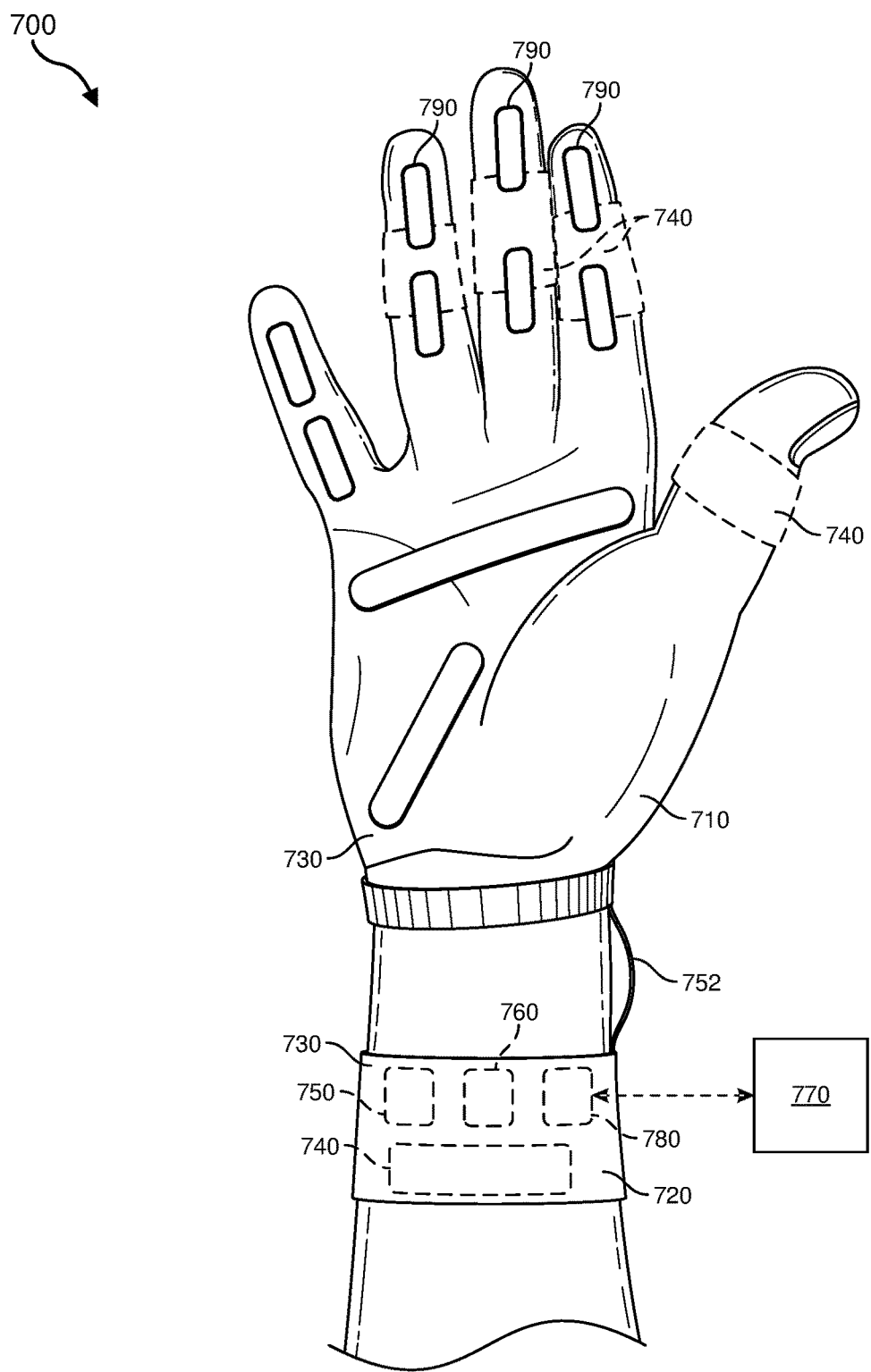
FIG. 7 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 7 illustrates a vibrotactile system 700 in the form of a wearable glove (haptic device 710) and wristband (haptic device 720). Haptic device 710 and haptic device 720 are shown as examples of wearable devices that include a flexible, wearable textile material 730 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 740 may be positioned at least partially within one or more corresponding pockets formed in textile material 730 of vibrotactile system 700. Vibrotactile devices 740 may be positioned in locations to provide a vibrating sensation (e.g., haptic feedback) to a user of vibrotactile system 700. For example, vibrotactile devices 740 may be positioned against the user's finger(s), thumb, or wrist, as shown in FIG. 7. Vibrotactile devices 740 may, in some examples, be sufficiently flexible to conform to or bend with the user's corresponding body part(s).

A power source 750 (e.g., a battery) for applying a voltage to the vibrotactile devices 740 for activation thereof may be electrically coupled to vibrotactile devices 740, such as via conductive wiring 752. In some examples, each of vibrotactile devices 740 may be independently electrically coupled to power source 750 for individual activation. In some embodiments, a processor 760 may be operatively coupled to power source 750 and configured (e.g., programmed) to control activation of vibrotactile devices 740.

Vibrotactile system 700 may be implemented in a variety of ways. In some examples, vibrotactile system 700 may be a standalone system with integral subsystems and components for operation independent of other devices and systems. As another example, vibrotactile system 700 may be configured for interaction with another device or system 770. For example, vibrotactile system 700 may, in some examples, include a communications interface 780 for receiving and/or sending signals to the other device or system 770. The other device or system 770 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 780 may enable communications between vibrotactile system 700 and the other device or system 770 via a wireless (e.g., Wi-Fi, Bluetooth, cellular, radio, etc.) link or a wired link. If present, communications interface 780 may be in communication with processor 760, such as to provide a signal to processor 760 to activate or deactivate one or more of the vibrotactile devices 740.

Vibrotactile system 700 may optionally include other subsystems and components, such as touch-sensitive pads 790, pressure sensors, motion sensors, position sensors, lighting elements, and/or user interface elements (e.g., an on/off button, a vibration control element, etc.). During use, vibrotactile devices 740 may be configured to be activated for a variety of different reasons, such as in response to the user's interaction with user interface elements, a signal from the motion or position sensors, a signal from the touch-sensitive pads 790, a signal from the pressure sensors, a signal from the other device or system 770, etc.

Although power source 750, processor 760, and communications interface 780 are illustrated in FIG. 7 as being positioned in haptic device 720, the present disclosure is not so limited. For example, one or more of power source 750, processor 760, or communications interface 780 may be positioned within haptic device 710 or within another wearable textile.

Figure 8:
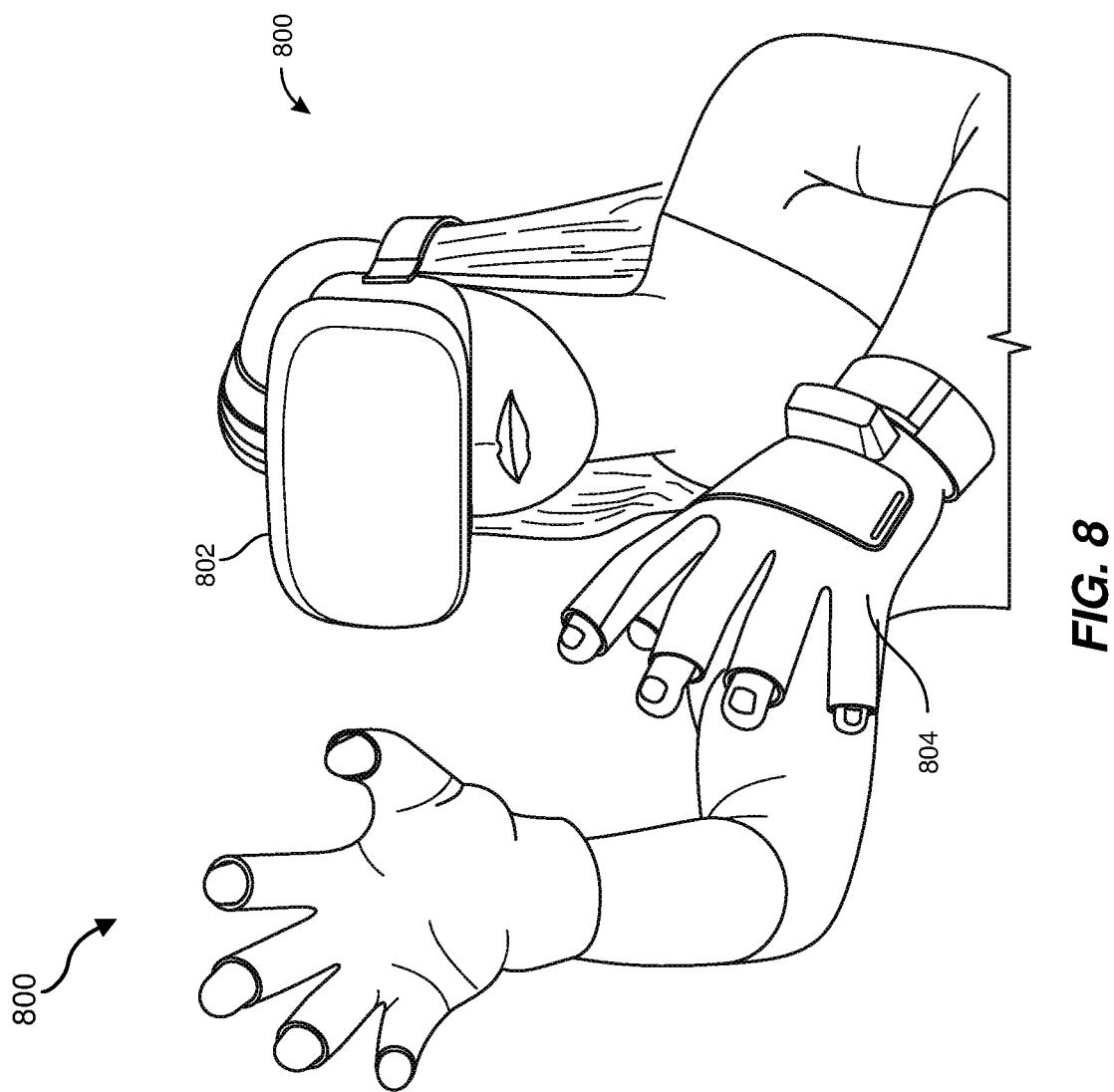
FIG. 8 is an illustration of an exemplary virtual-reality environment according to embodiments of this disclosure.

Haptic wearables, such as those shown in and described in connection with FIG. 7, may be implemented in a variety of types of artificial-reality systems and environments. FIG. 8 shows an example artificial-reality environment 800 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 6:
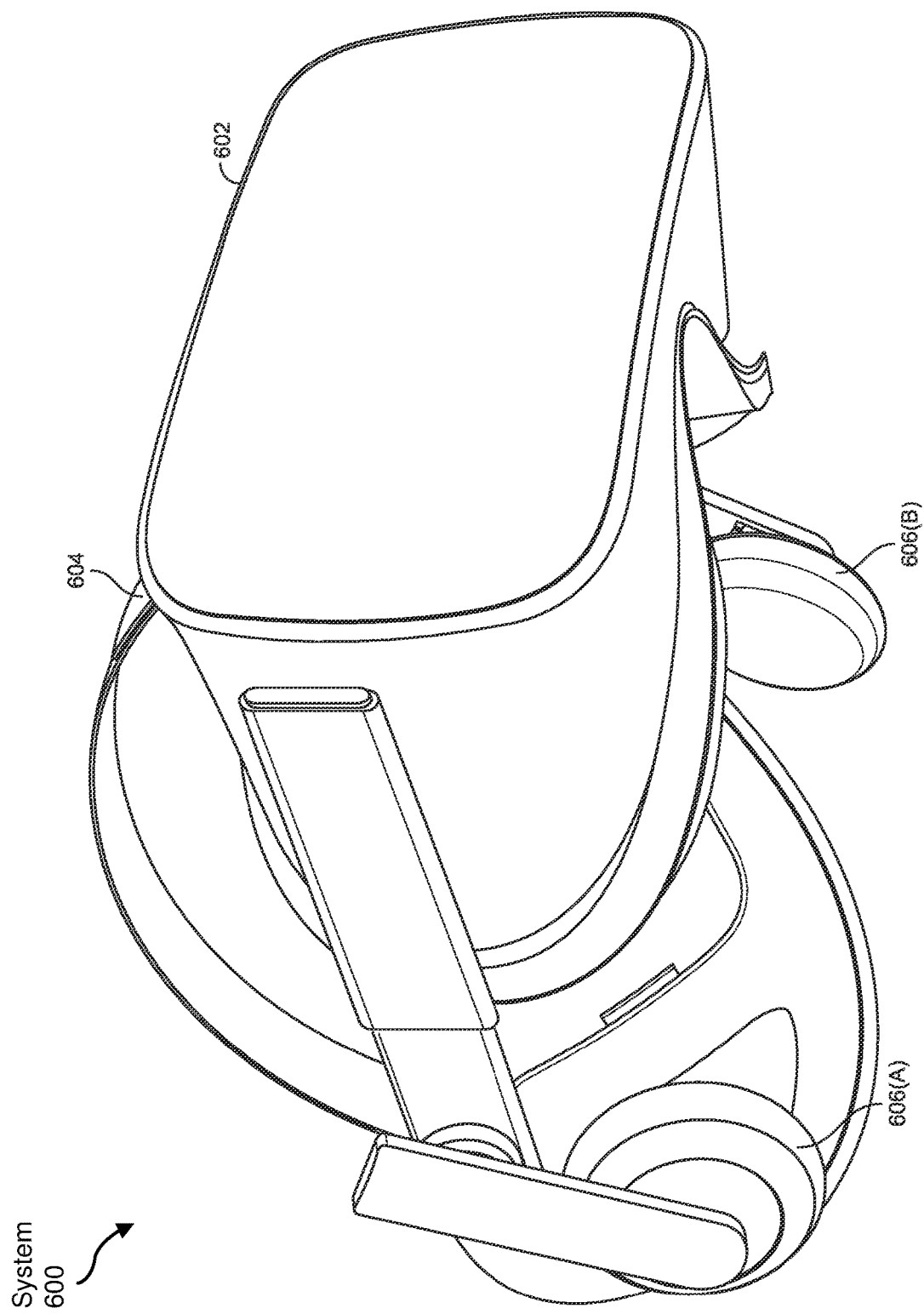
FIG. 6 is an illustration of an exemplary virtual-reality headset that may be used in connection with embodiments of this disclosure.

Head-mounted display 802 generally represents any type or form of virtual-reality system, such as virtual-reality system 600 in FIG. 6. Haptic device 804 generally represents any type or form of wearable device, worn by a user of an artificial-reality system, that provides haptic feedback to the user to give the user the perception that he or she is physically engaging with a virtual object. In some embodiments, haptic device 804 may provide haptic feedback by applying vibration, motion, and/or force to the user. For example, haptic device 804 may limit or augment a user's movement. To give a specific example, haptic device 804 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 804 to send action requests to a console. Examples of action requests include, without limitation, requests to start an application and/or end the application and/or requests to perform a particular action within the application.

Figure 9:
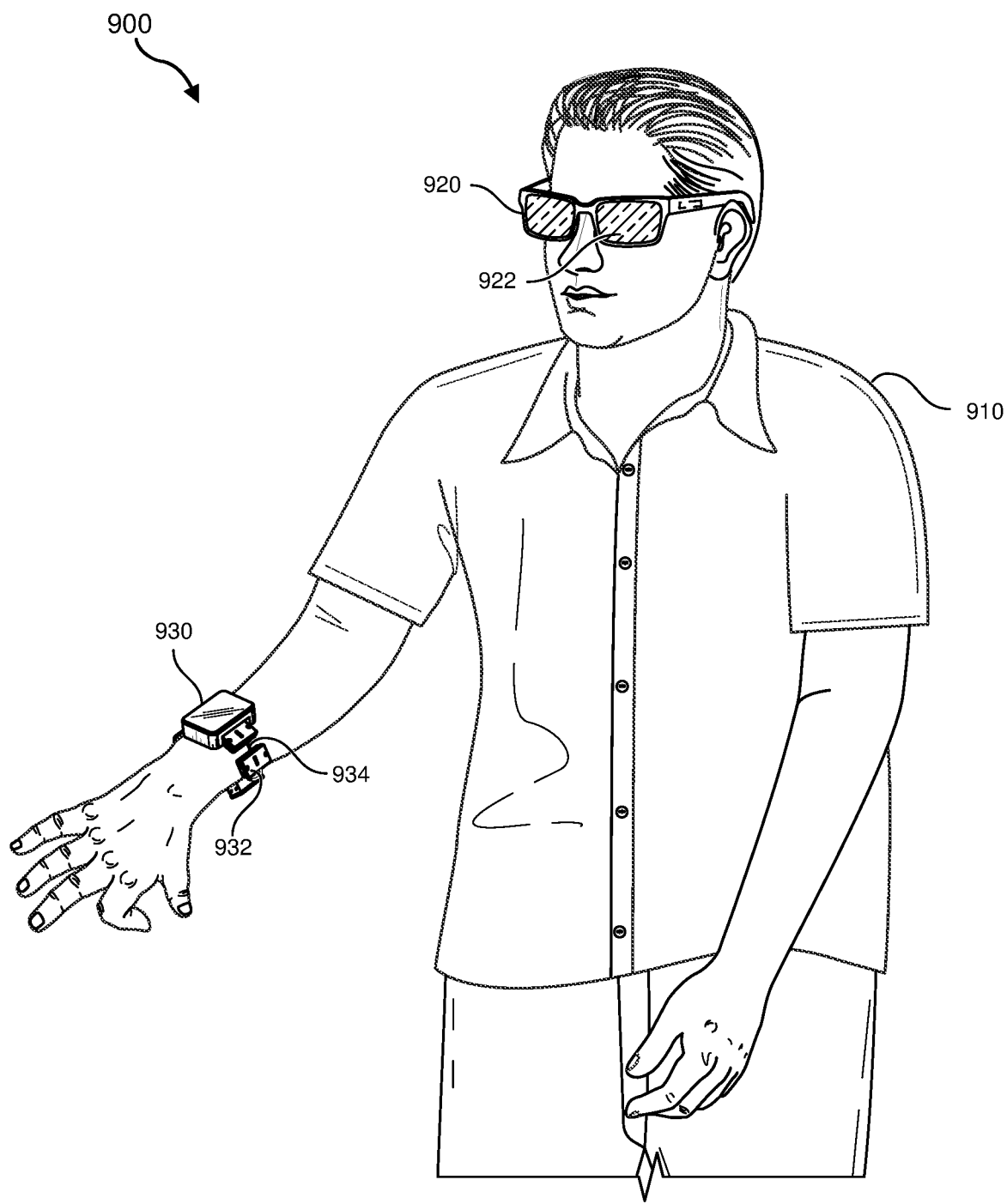
FIG. 9 is an illustration of an exemplary augmented-reality environment according to embodiments of this disclosure.

While haptic interfaces may be used with virtual-reality systems, as shown in FIG. 8, haptic interfaces may also be used with augmented-reality systems, as shown in FIG. 9. FIG. 9 is a perspective view of a user 910 interacting with an augmented-reality system 900. In this example, user 910 may wear a pair of augmented-reality glasses 920 that may have one or more displays 922 and that are paired with a haptic device 930. In this example, haptic device 930 may be a wristband that includes a plurality of band elements 932 and a tensioning mechanism 934 that connects band elements 932 to one another.

One or more of band elements 932 may include any type or form of actuator suitable for providing haptic feedback. For example, one or more of band elements 932 may be configured to provide one or more of various types of cutaneous feedback, including vibration, force, traction, texture, and/or temperature. To provide such feedback, band elements 932 may include one or more of various types of actuators. In one example, each of band elements 932 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 710, 720, 804, and 930 may include any suitable number and/or type of haptic transducer, sensor, and/or feedback mechanism. For example, haptic devices 710, 720, 804, and 930 may include one or more mechanical transducers, piezoelectric transducers, and/or fluidic transducers. Haptic devices 710, 720, 804, and 930 may also include various combinations of different types and forms of transducers that work together or independently to enhance a user's artificial-reality experience. In one example, each of band elements 932 of haptic device 930 may include a vibrotactor (e.g., a vibrotactile actuator) configured to vibrate in unison or independently to provide one or more of various types of haptic sensations to a user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A biopotential measurement device comprising:
   a biopotential measurement circuit;
   a right leg drive circuit coupled to the biopotential measurement circuit;
   a first electrode coupled to the biopotential measurement circuit;
   a second electrode coupled to the biopotential measurement circuit; and
   a chassis housing the biopotential measurement circuit and the right leg drive circuit, wherein the first electrode and the second electrode are disposed on a planar surface of the chassis, the planar surface comprising a conductive surface made of a conductive material and extending over an entirety of the planar surface excluding the first and second electrodes, the conductive surface being coupled to the right leg drive circuit and surrounding the first electrode and the second electrode.

2. The biopotential measurement device of claim 1, further comprising:
   a shield layer opposite the conductive surface; and
   a skin interface portion, wherein the biopotential measurement circuit is between the shield layer and the conductive surface and the skin interface portion at least partially surrounds the biopotential measurement circuit such that the shield layer, skin interface portion, and the conductive surface forms a Faraday cage that electrically shields the biopotential measurement circuit.

3. The biopotential measurement device of claim 2, wherein the shield layer comprises a top layer of the biopotential measurement circuit.

4. The biopotential measurement device of claim 3, wherein the biopotential measurement circuit comprises at least one of a printed circuit board or a flexible circuit.

5. The biopotential measurement device of claim 2, wherein the skin interface portion comprises at least one of a foam material, a rubber material, a plastic material, a hard electrode, or a pogo pin.

6. The biopotential measurement device of claim 2, wherein the shield layer, the skin interface portion, and the conductive surface form the Faraday cage for electrically shielding the right leg drive circuit.

7. The biopotential measurement device of claim 1, wherein the conductive material comprises at least one of a metal, an impregnated plastic, or a conductive coating.

8. The biopotential measurement device of claim 1, wherein the conductive surface drives a right leg drive signal from the right leg drive circuit to a body part touching the conductive surface.

9. The biopotential measurement device of claim 8, wherein the right leg drive signal comprises a known voltage.

10. The biopotential measurement device of claim 8, wherein the right leg drive signal comprises an inverse noise signal.

11. The biopotential measurement device of claim 1, wherein the biopotential measurement device comprises a watch form factor.

12. The biopotential measurement device of claim 11, wherein the conductive material is a conductive coating applied to a non-conductive surface of the chassis.

13. A system comprising:
    at least one physical processor;
    physical memory comprising computer-executable instructions; and
    a biopotential measurement device communicatively coupled to the at least one physical processor, comprising:
    a biopotential measurement circuit;
    a right leg drive circuit coupled to the biopotential measurement circuit;
    a first electrode coupled to the biopotential measurement circuit;
    a second electrode coupled to the biopotential measurement circuit; and
    a chassis housing the biopotential measurement circuit and the right leg drive circuit, wherein the first electrode and the second electrode are disposed on a planar surface of the chassis, the planar surface comprising a conductive surface made of a conductive material and extending over an entirety of the planar surface excluding the first and second electrodes, the conductive surface being coupled to the right leg drive circuit and surrounding the first electrode and the second electrode.

14. The system of claim 13, wherein the biopotential measurement device further comprises:
    a shield layer opposite the conductive surface; and
    a skin interface portion,
    wherein the biopotential measurement circuit is between the shield layer and the conductive surface and the skin interface portion at least partially surrounds the biopotential measurement circuit such that the shield layer, skin interface portion, and the conductive surface forms a Faraday cage that electrically shields the biopotential measurement circuit.

15. The system of claim 14, wherein: the shield layer comprises a top layer of the biopotential measurement circuit; the biopotential measurement circuit comprises at least one of a printed circuit board or a flexible circuit; and the skin interface portion comprises at least one of a foam material, a rubber material, a plastic material, a hard electrode, or a pogo pin.

16. The system of claim 13, wherein the conductive surface drives a right leg drive signal from the right leg drive circuit to a body part touching the conductive surface, wherein the right leg drive signal comprises at least one of a known voltage or an inverse noise signal.

17. The system of claim 13, wherein the at least one physical processor and the physical memory comprise an artificial reality system.

18. The system of claim 17, wherein the biopotential measurement device sends data from the biopotential measurement circuit to the artificial reality system.

19. A method comprising:
- coupling a right leg drive circuit to a biopotential measurement circuit;
- coupling a first electrode to the biopotential measurement circuit;
- coupling a second electrode to the biopotential measurement circuit;
- coupling a conductive surface of a chassis to the right leg drive circuit,
- wherein the first electrode and the second electrode are disposed on a planar surface of the chassis comprising the conductive surface, and the conductive surface is made of a conductive material and extends over an entirety of the planar surface excluding the first and second electrodes, the conductive surface surrounding the first electrode and the second electrode; and
- placing the biopotential measurement circuit and the right leg drive circuit inside the chassis.

20. The method of claim 19, further comprising placing a shield layer opposite the conductive surface and a skin interface portion at least partially around the biopotential measurement circuit to form a Faraday cage that electrically shields the biopotential measurement circuit.

* * * * *